(12) United States Patent
Pomerene et al.

(10) Patent No.: US 9,354,393 B2
(45) Date of Patent: May 31, 2016

(54) METHOD FOR POLISHING PHOTONIC CHIPS

(71) Applicant: BAE SYSTEMS INFORMATION AND ELECTRONIC SYSTEMS INTEGRATION INC., Nashua, NH (US)

(72) Inventors: Andrew T S Pomerene, Leesburg, VA (US); Matthew A. Gregory, Woodbridge, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/790,963

(22) Filed: Jul. 2, 2015

(65) Prior Publication Data

US 2016/0004011 A1  Jan. 7, 2016

Related U.S. Application Data

(60) Provisional application No. 62/020,191, filed on Jul. 2, 2014.

(51) Int. Cl.
| | | |
|---|---|---|
| G02B 6/10 | (2006.01) | |
| G02B 6/13 | (2006.01) | |
| G02B 6/122 | (2006.01) | |
| B24B 9/06 | (2006.01) | |
| B24B 49/02 | (2006.01) | |
| G02B 6/12 | (2006.01) | |

(52) U.S. Cl.
CPC . *G02B 6/13* (2013.01); *B24B 9/065* (2013.01); *B24B 49/02* (2013.01); *G02B 6/122* (2013.01); *G02B 2006/121* (2013.01); *G02B 2006/12197* (2013.01)

(58) Field of Classification Search
None
See application file for complete search history.

(56) References Cited

U.S. PATENT DOCUMENTS 4,317,699 A * 3/1982 Winzer ............... G02B 6/2817
156/159

* cited by examiner

*Primary Examiner* — Uyen Chau N Le
*Assistant Examiner* — Chad Smith
(74) *Attorney, Agent, or Firm* — Antony P. Ng; Russell Ng PLLC; Daniel J. Long

(57) ABSTRACT

A method for polishing photonic chips is described. A gauge is placed in a photonic chip adjacent to an edge to be polished. The gauge includes a set of bars of various lengths. The bar lengths can be progressively ordered from shortest to longest or vice versa. The photonic chip is then secured in a chip polishing jig to get ready for polishing. When the photonic chip is being polished, an operator can visually inspect the gauge by looking at the polishing edge to estimate a polishing depth in order to determine a stopping point for polishing. Once the stopping point has been reached, the polishing of the photonic chip can be stopped.

15 Claims, 4 Drawing Sheets

METHOD FOR POLISHING PHOTONIC CHIPS

PRIORITY CLAIM

The present application claims priority under 35 U.S.C. §119(e)(1) to provisional application No. 62/020,191, filed on Jul. 2, 2014, the contents of which are incorporated herein by reference.

STATEMENT OF GOVERNMENT INTEREST

This invention was made with United States Government support under Contract No. HR0011-05-C-0027 awarded by the DEFENSE ADVANCED RESEARCH DEPARTMENTS AGENCY. The United States Government has certain rights in this invention.

BACKGROUND OF THE INVENTION

1. Technical Field

The present invention relates to photonic chips in general, and in particular to a method for polishing photonic chips.

2. Description of Related Art

Conventional photonic chips are typically made from silicon wafers. Silicon wafers tend to be comparatively large, but many photonic chips are required to be in relatively smaller sizes. In order to reach the desired size, the edges of silicon wafers must be cut typically with a diamond tipped saw. However, cutting with a diamond tipped saw will leave silicon wafers with rough or jagged edges, and rough edges are not ideal for optical transmissions. Thus, rough edges need to be polished in order to ensure low-loss coupling to external optical fibers, especially for photonic chips that utilize waveguides extending to the edge of the photonic chips.

Conventional polishing methods suffer in that the polishing of many photonic chips at the same time requires the use of a chip polishing jig that holds the photonic chips perpendicular to a polish platen, and such arrangement does not permit the top edges of the photonic chips to be viewed by an operator. Since the operator cannot see the top of a photonic chip, it is impossible for the operator to determine how deep into the photonic chip that the polish has removed without taking the photonic chip off from the chip polishing jig. Needless to say, additional time is required for the operator to un-mount and remount the photonic chip, which leads to an increase in operational time and a decrease in operational efficiency.

Consequently, it would be desirable to provide an improved method for polishing photonic chips.

SUMMARY OF THE INVENTION

In accordance with a preferred embodiment of the present invention, a gauge is placed in a photonic chip adjacent to an edge to be polished. The gauge includes a set of bars of various lengths. The bar lengths can be progressively ordered from shortest to longest or vice versa. The photonic chip is then secured in a chip polishing jig to get ready for polishing. When the photonic chip is being polished, an operator can visually inspect a the gauge by looking at the polishing edge to estimate a polishing depth in order to determine a stopping point for polishing. Once the stopping point has been reached, the polishing of the photonic chip can be stopped.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

During edge polishing of a photonic chip, it is important not to polish too deeply into the photonic chip or the waveguides included within. Thus, as a preferred embodiment of the present invention, at least one gauge is placed within a photonic chip in order to assist an operator to determine the progress of an edge polishing process via visual inspection.

Figure 1:
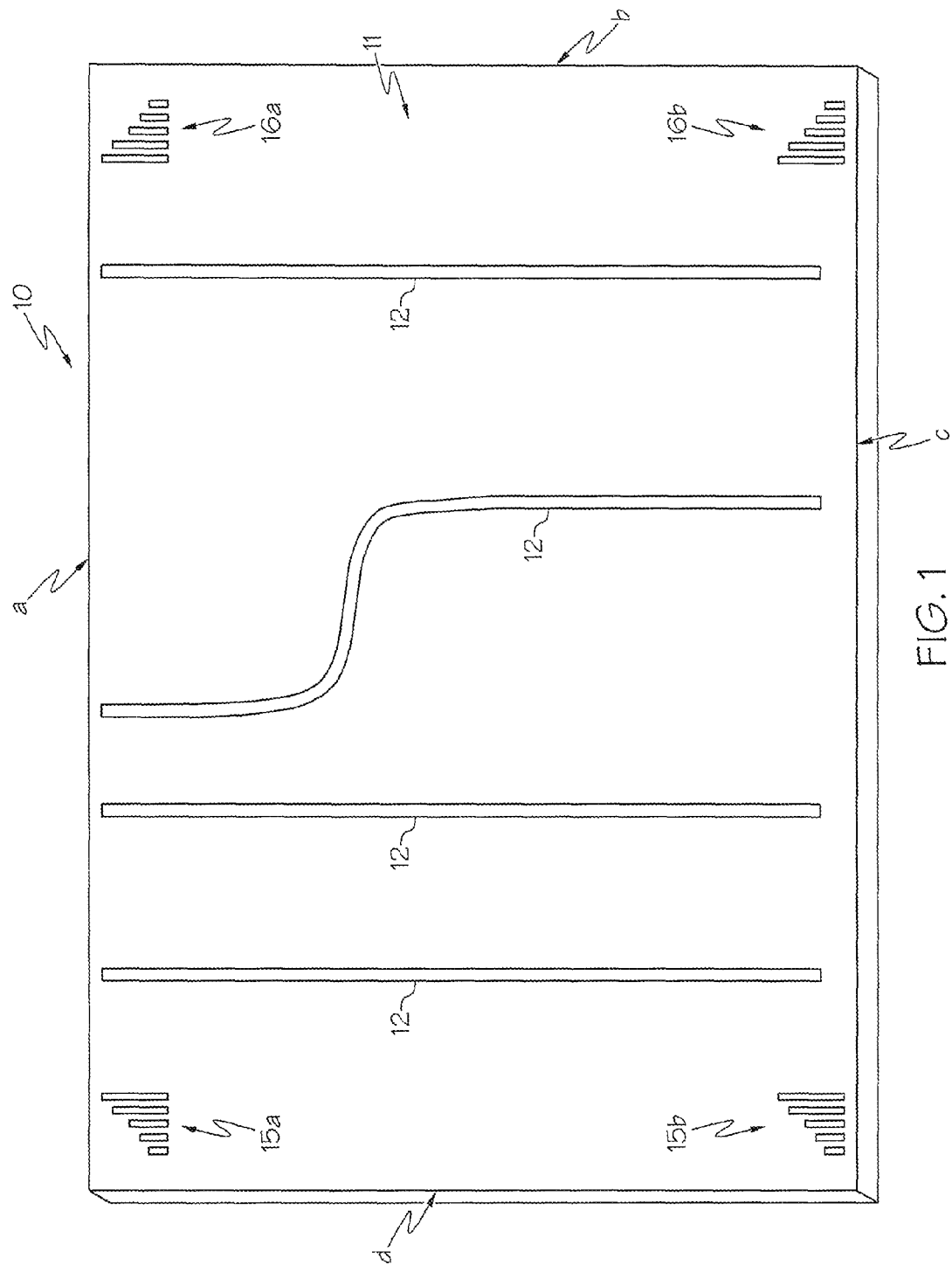
FIG. 1 is an isometric view of a photonic chip in which a preferred embodiment of the present invention can be incorporated.

Referring now to the drawings and in particular to FIG. 1, there is illustrated an isometric view of a photonic chip in which a preferred embodiment of the present invention can be incorporated. As shown, a photonic chip 10 includes a top surface 11 and four edges (side surfaces) a-d. Photonic chip 10 can be of any size, and the length and width of top surface 11 preferably defines the size of photonic chip 10, while the depths of edges a-d are substantially smaller than the length or width of photonic chip 10. Multiple waveguides 12 are located within photonic chip 10 underneath top surface 11. Waveguides 12 may be made of silicon, optical fibers or any other light transmitting media. Waveguides 12 may travel from one edge of photonic chip 10 to another edge of photonic chip 10. For example, in FIG. 1, waveguides 12 are shown to travel from edge a to edge c.

A set of gauges 15a and 15b is located within photonic chip 10 underneath top surface 11, preferably at the same level where waveguides 12 are built. Gauges 15a and 15b are located adjacent to edges a and c, respectively. Each of gauges 15a and 15b may include a series of bars of varying lengths. The bar lengths can be progressively ordered from shortest to longest or from longest to shortest. Preferably, gauges 15a-15b are made of the same or similar materials as waveguide 12.

As shown in FIG. 1, the longest bar of gauge 15a is closer to edge a than the other bars of gauge 15a. For example, the longest bar of gauge 15a starts at 10 μm away from edge a, the second bar starts at 10 μm farther away than that (i.e., 20 μm away from edge a), the third bar starts at another 10 μm farther (i.e., 30 μin away from edge a), the fourth bar starts at another 10 μm farther (i.e., 40 μm away from edge a), and the fifth bar starts at another 10 μm farther (i.e., 50 μm away from edge a).

Alternatively, all the bars of gauge 15b start at the same distance from edge c even though the lengths of the bars of gauge 15b are different from each other. For example, all the bars of gauge 15b are located at 10 μm from edge c.

Photonic chip 10 may include additional gauges such as gauges 16a and 16b. Gauges 16a and 16b may have the same structure as gauges 15a and 15b, respectively, and are located near edges a and c of top surface 11 similarly to gauges 15a and 15b, respectively. Each of the bars of gauges 16a is located at a different distance from edge a as each of the bars of gauge 15a. Similarly, all the bars of gauges 16b are located at the same distance from edge c like all the bars of gauge 15b. Gauges 15a-15b and 16a-16b also have similar alignments.

Figure 2:
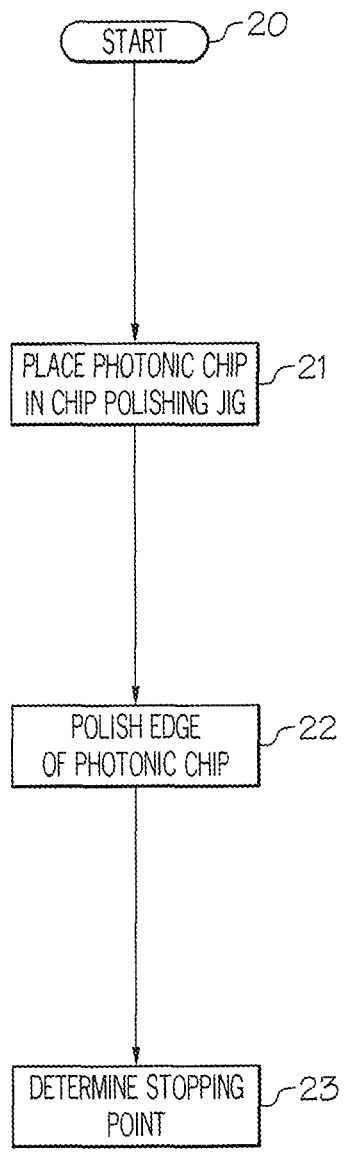
FIG. 2 is a flow diagram showing a method for polishing the photonic chip from FIG. 1, in accordance with a preferred embodiment of the present invention.

With reference now to FIG. 2, there is depicted a method for polishing photonic chips, in accordance with a preferred embodiment of the present invention. Starting at block 20, a photonic chip having multiple gauges, such as photonic chip 10 from FIG. 1, is placed in a chip polishing jig, as shown in block 21. After the photonic chip has been mounted on the chip polishing jig, an operator can start polishing the photonic chip on one of the edges, as depicted in block 22. The chip polishing jig will only allow an edge being polished to be visible to the operator.

Figure 3A:
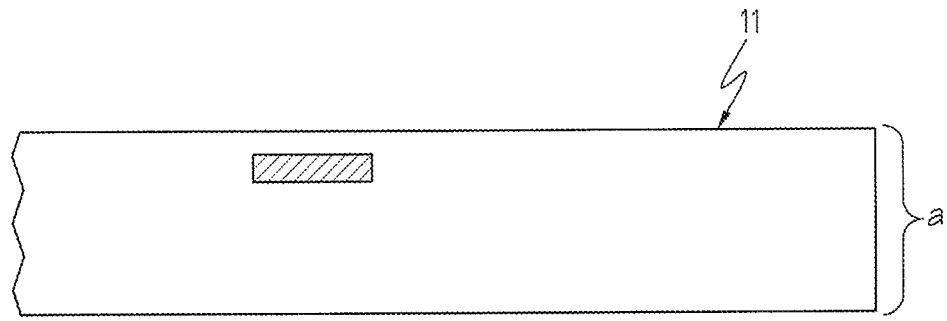
FIGS. 3A-3C depict various depths of polishing as indicated by the number of bars appearing.
Figure 3B:
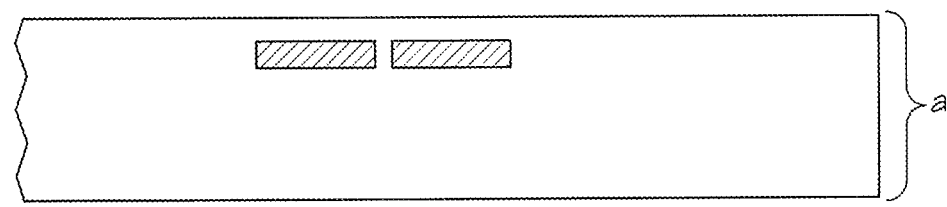
Figure 3C:
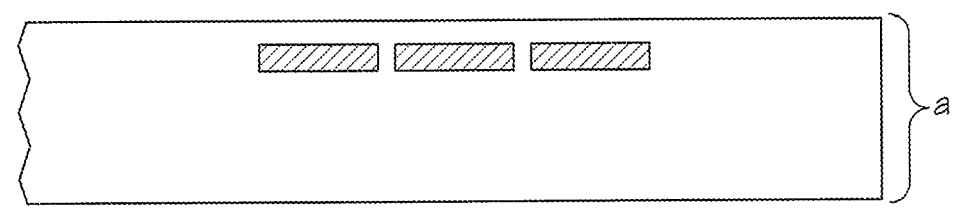

Because of how each of the gauges is located near an edge of the photonic chip (such as gauge 15a near edge a), the bars should become visible as the operator is viewing from a side surface while the corresponding edge is being polished. For example, if edge a of photonic chip 10 from FIG. 1 is being polished, after polishing 10 µm into edge a, the first bar of gauge 15a will become visible from the polished edge a, as shown in FIG. 3A. After polishing 20 µm into edge a, the first and second bar will become visible from the polished edge a, as depicted FIG. 3B. After polishing 30 µm into edge a, the first, second and third bar will become visible from the polished edge a, as shown FIG. 3C. The operator can use the number of bars to determine whether or not edge a has been polished down to the right amount, as shown in block 23. As a result, the operator can decide how deep into edge a should the photonic chip be polished simply by visually inspecting the bars of gauge 15a without removing the photonic chip from the chip polishing jig.

Figure 4A:
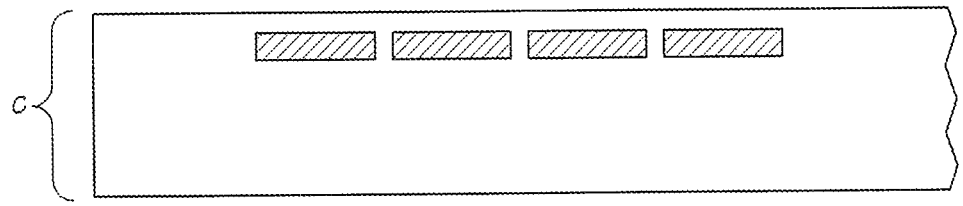
FIGS. 4A-4C depict various depths of polishing as indicated by the number of bars disappearing.
Figure 4B:
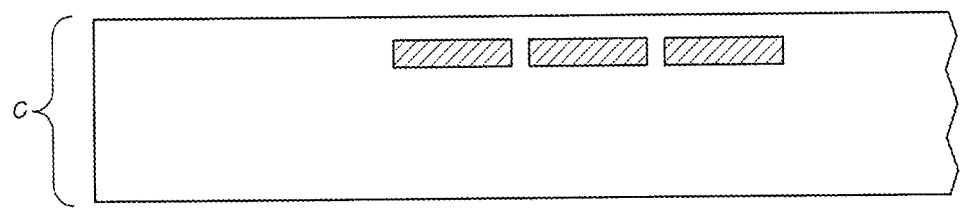
Figure 4C:
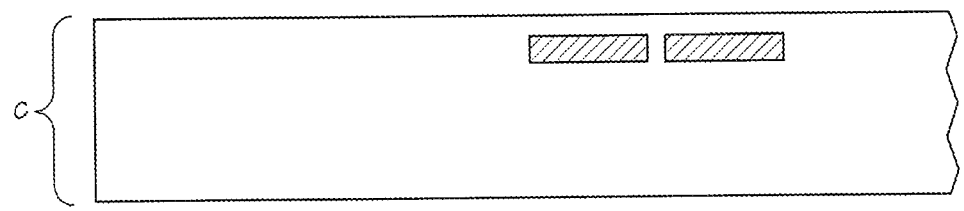

Alternatively, when edge c is being polished, the shortest bar of gauge 15b will disappear first after polishing 10 µm into edge c. After polishing 20 µm into edge c, two of the five bars will disappear from the polished edge c. For edge c, the operator can visually estimate the polish depth based on the number of bars remaining. In other words, for edge c, cutting past 10 µm into edge c will erase the shortest bar of gauge 15b, and only 4 bars will remain to be visible from edge c, as shown in FIG. 4A. If the polishing on edge c continues for another 10 µm, then the next shortest bar of gauge 15b would be erased, and only 3 bars of gauge 15b will remain to be visible from edge c, as depicted in FIG. 4B. If the polishing on edge c continues for another 10 µm, then only 2 bars of gauge 15b will remain to be visible from edge c, as shown in FIG. 4C.

In addition, with two gauges located adjacent near the same edge, such as gauges 15a and 16a near edge a, an operator may use the two gauges to ensure that an equal amount of the material has been polished across the same edge that needs to be polished. After the edge polishing has been completed, the operator can check both gauges to ensure that the numbers bars match with each other. If there is an even level of polishing, then an equal number of bars will be visible from each of the two gauges.

Due to the general size of photonic chip 10, the chip polishing jig may include a magnifying element, such as a magnifying lens to assist an operator to visual inspect the number of revealed bars on a gauge. In addition, all five bars of gauges 15a may be visible to an operator viewing from the side surface of edge a even before polishing, but each of the five bars will have a different intensity based on their respective distance from edge a.

As has been described, the present invention provides an improved method for polishing photonic chips.

While the invention has been particularly shown and described with reference to a preferred embodiment, it will be understood by those skilled in the art that various changes in form and detail may be made therein without departing from the spirit and scope of the invention.

What is claimed is:

1. A method for polishing a photonic chip edge, said method comprising:
   placing a gauge underneath a surface of a photonic chip, wherein said gauge is located adjacent to an edge to be polished, wherein said gauge includes a plurality of bars of various lengths;
   securing said photonic chip in a chip polishing jig;
   when said photonic chip is being polished, determining a stopping point by visually inspecting said bars of said gauge to estimate a polishing depth at which polishing should stop; and
   stopping polishing said photonic chip after said stopping point has been reached.

2. The method of claim 1, wherein said determining further includes basing on the number of bars on said gauge uncovered by said polishing.

3. The method of claim 1, wherein said determining further includes basing on the number of bars on said gauge removed by said polishing.

4. The method of claim 1, wherein said bars are located at different distance from said edge.

5. The method of claim 1, wherein said bars are located at equal distance from said edge.

6. The method of claim 1, wherein said gauge is located at the same level as a waveguide.

7. The method of claim 1, wherein said gauge is made of the same material as a waveguide.

8. The method of claim 1, wherein said gauge is made of silicon.

9. The method of claim 1, wherein said visually inspecting further includes using a magnification lens.

10. The method of claim 1, wherein said method further includes
    placing a second gauge on said surface of said photonic chip, wherein said second gauge is located adjacent to said edge to be polished; and
    comparing said gauge with said second gauge to ensure that said edge to be polished is sufficiently evenly polished.

11. A photonic chip comprising:
    a surface;
    at least one optical waveguide located underneath said surface; and
    a gauge located underneath said surface and adjacent to said at least one optical waveguide and adjacent to an edge to be polished, wherein said gauge includes a plurality of bars of various lengths, said bars being progressively ordered from shortest to longest, said longest lengthen bar being sufficiently leveled with said at least one waveguide.

12. The photonic chip of claim 11, further comprising a second gauge on said surface and adjacent to said edge to be polished.

13. The photonic chip of claim 11, wherein said gauge is located at the same levels as a waveguide.

14. The photonic chip of claim 11, wherein said gauge is made of the same material as a waveguide.

15. The photonic chip of claim 11, wherein said gauge is made of silicon.

* * * * *